(No Model.)
J. E. MUSTARD.
WHEEL.
No. 324,952. Patented Aug. 25, 1885.
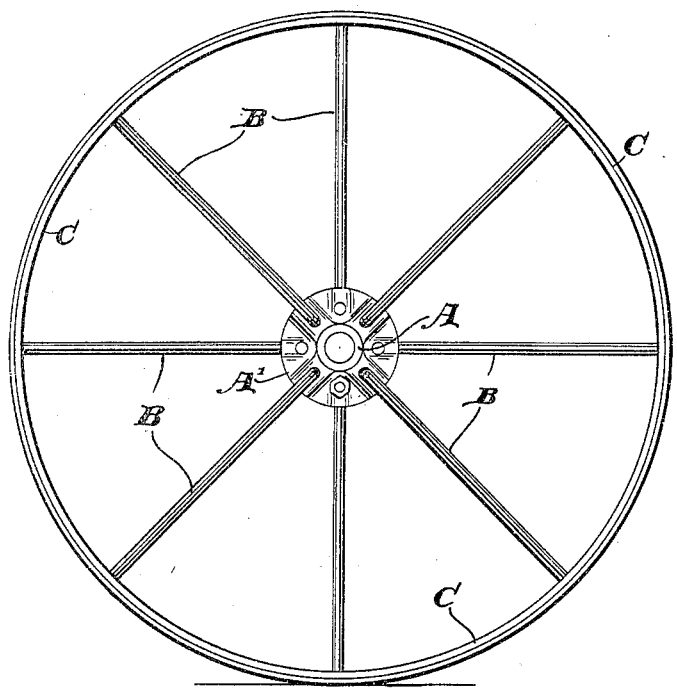
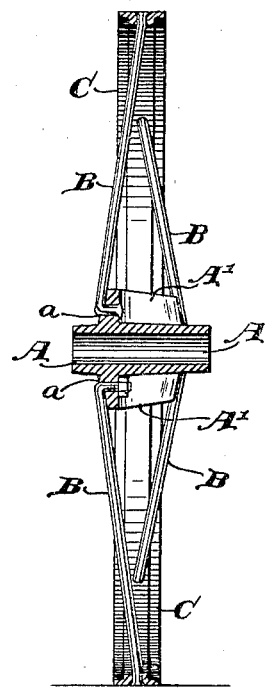
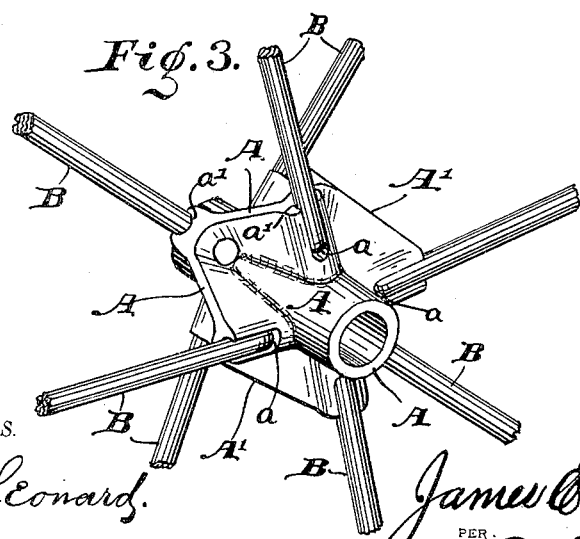
WITNESSES.
Chas. N. S. Leonard.
E. W. Bradford.
INVENTOR.
James E. Mustard,
PER
C. Bradford,
ATTORNEY.

UNITED STATES PATENT OFFICE.

JAMES E. MUSTARD, OF GLEN HALL, INDIANA.

WHEEL.

SPECIFICATION forming part of Letters Patent No. 324,952, dated August 25, 1885.

Application filed December 1, 1884. (No model.)

*To all whom it may concern:*

Be it known that I, JAMES E. MUSTARD, of the town of Glen Hall, county of Tippecanoe, and State of Indiana, have invented certain new and useful Improvements in Wheels, of which the following is a specification.

My said invention relates to that class of wheels known as "staggered wheels;" and it consists in an improved construction of the hub and spokes and means for securing them together, as will be hereinafter more fully described.

Referring to the accompanying drawings, which are made a part hereof, and on which similar letters of reference indicate similar parts, Figure 1 is a side elevation of a wheel embodying my said invention; Fig. 2, a sectional view of the same, looking toward the right from the dotted line $z\ z$, and Fig. 3 a perspective view of the hub with a short portion of the spokes secured therein.

In said drawings, the portions marked A represent the hub; B, the spokes, and C the rim.

The hub A is preferably cast of iron or other metal. It has a flange, A', which extends around on its outside, preferably in a zigzag line back and forth from a point at or near one end of the hub to a point at or near the other, as shown. At the points where said flange turns it is formed to receive the spokes, and holes $a$ are formed in said flange parallel with the axle to receive the ends of the spokes. Radial grooves $a'$ are also preferably formed on the outside of said flange, extending from each of said holes $a$ to the top of the flange, thus forming a bearing in which the inner ends of the spokes rest, as will be presently described.

The spokes B are preferably made of round iron or steel, and have their outer ends riveted or otherwise firmly secured in the rim. Their inner ends are bent at substantially right angles with the main parts thereof, and said bent portions are inserted through the holes $a$ and riveted therein, as shown. The spokes rest in the grooves $a'$ up to the top of the flange, and are thus stayed and firmly secured to the hub. Instead of being riveted, the ends of the bent portions of the spokes may be formed screw-threaded, and nuts used for securing them in their places in the flange, if desired; or the ends of the spoke may be inserted from the inside of the flange and riveted on the outside; but I prefer the construction shown.

The rim C is any ordinary rim of suitable construction, and has the other ends of the spokes riveted or otherwise firmly secured therein.

By this construction of hub the spokes are easily and very rigidly secured therein, and a cheap and durable staggered wheel is produced.

Having thus fully described my said invention, what I claim as new, and desire to secure by Letters Patent, is—

1. A hub for staggered wheels, provided with a zigzag flange around its outside extending back and forth lengthwise of said hub, said flange being provided with transverse holes at its points in which the spokes of the wheel may be easily secured by a nut or by being riveted therein, substantially as set forth.

2. The combination of the hub A, having a zigzag flange, A', with holes $a$, and grooves $a'$, spokes B, the inner ends of which are bent and riveted in the holes $a$ in the flange, and the outer ends of which are secured in the rim C, and said rim C, substantially as set forth.

3. A hub for staggered wheels, having a zigzag flange around its outside, said flange being cast integrally therewith and provided with transverse holes at its points in which the spokes of the wheels may be easily secured, substantially as set forth.

In witness whereof I have hereunto set my hand and seal at Indianapolis, Indiana, this 25th day of November, A. D. 1884.

JAMES E. MUSTARD. [L. S.]

In presence of—
C. BRADFORD,
CHARLES L. THURBER.